Sept. 23, 1941.  W. E. O'SHEI  2,257,066
WIND SCREEN WIPER
Filed Oct. 18, 1940  2 Sheets-Sheet 1
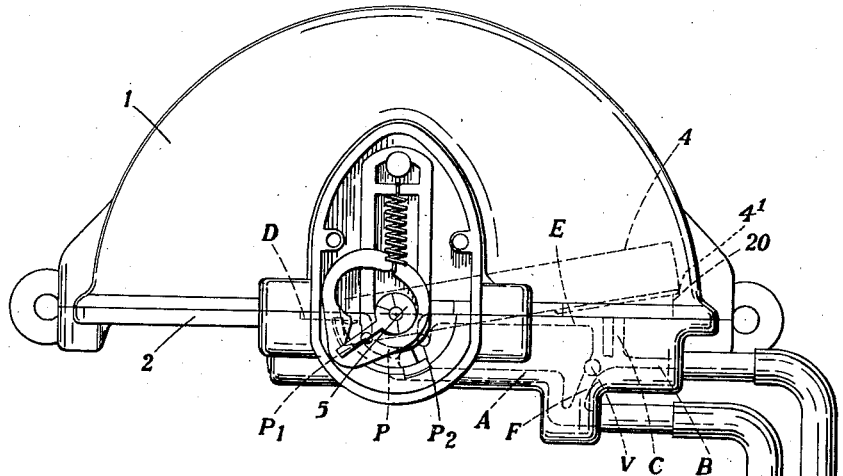
Fig. 1.
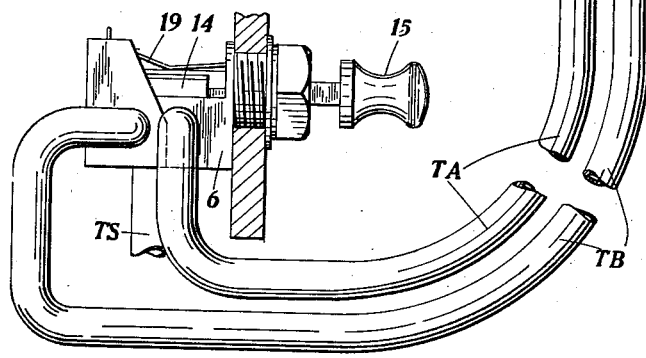
Fig. 2.
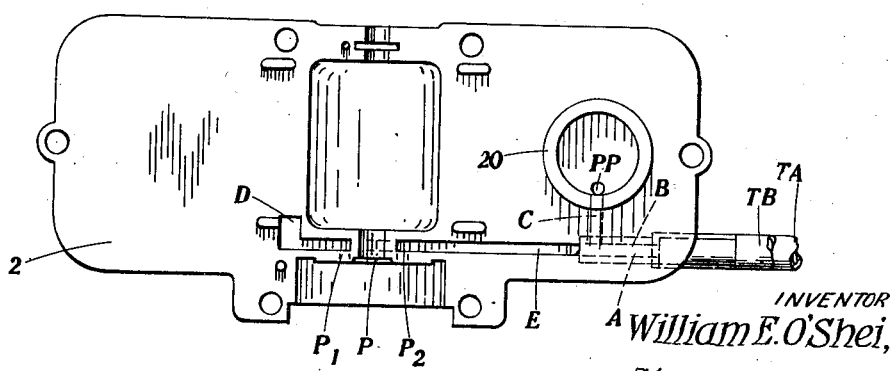
INVENTOR
William E. O'Shei,
BY
Beau, Brooks, Buckley & Beau.
ATTORNEYS Sept. 23, 1941.  W. E. O'SHEI  2,257,066
WIND SCREEN WIPER
Filed Oct. 18, 1940  2 Sheets-Sheet 2
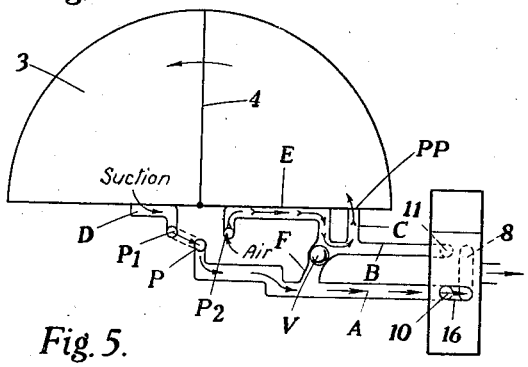
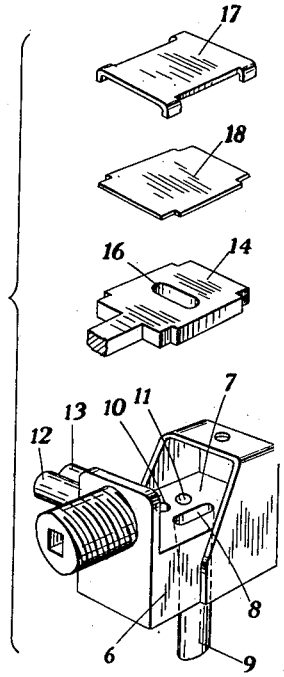
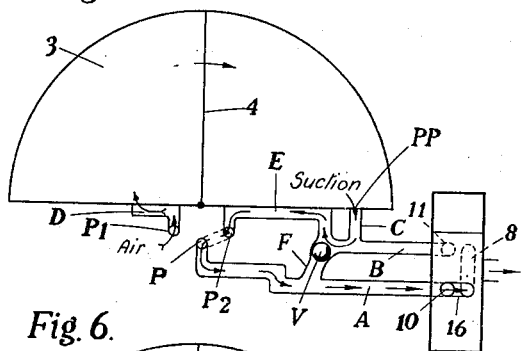
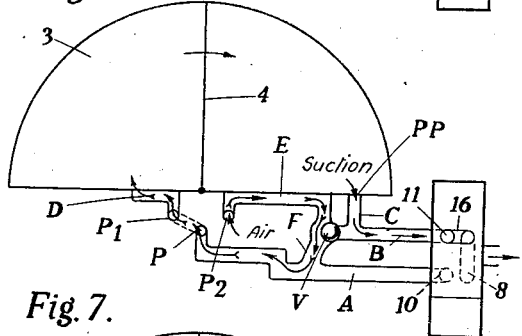
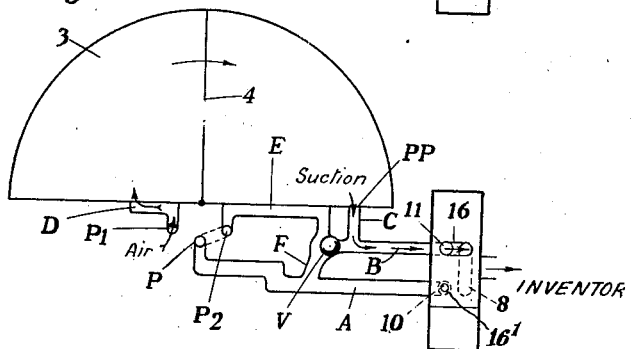
INVENTOR
BY William E. O'Shei,
Beau, Brooks, Buckley & Beau. ATTORNEYS

UNITED STATES PATENT OFFICE

2,257,066
WIND-SCREEN WIPER
William Edward O'Shei, London, England

Application October 18, 1940, Serial No. 361,793
In Great Britain September 8, 1939

10 Claims. (Cl. 121—97)

This invention relates to windscreen wipers of the type operated by fluid pressure or suction and in which the wiper blade thereof is automatically brought to and retained in a predetermined position (called the "parking" position) when the wiper is not in use, this parking position being arranged at one limit position of the normal sweep of the wiper blade or, as in current practice, outside this limit so as not to obstruct vision through the windscreen. The invention is more particularly concerned with the motors of this type of wiper.

Such motors comprise essentially a piston or paddle which is adapted to be reciprocated in a chamber by fluid pressure or suction applied by automatic valve mechanism alternately to the opposite sides of the piston, the operation of such a motor being controlled usually by means of a valve in the line from the source of the fluid pressure or suction to the motor. This control valve, when in one position thereof, operates to connect the power source to the automatic valve mechanism of the motor thereby causing the motor to be operated, and when in another position the control valve disconnects the power source from the automatic valve mechanism so as to stop the motor. Automatic parking is achieved in such a motor by arranging that the control valve, when in its second-mentioned position, connects the power source to one side only of the piston thereby causing the latter to move to its parking position. It has also been arranged for the piston on reaching its parking position to close off from the motor the source of the fluid pressure or suction, in order to relieve the piston chamber of any constant fluid pressure or suction influence which would tend to dry out the lubricant present in the chamber between the chamber walls and piston, with consequential leakage around the piston.

With the usual windscreens hinged at the top it was the usual practice, in order not to interfere with the opening of the windscreen, to mount the wiper at or above the top of the windscreen to operate a wiper blade over the upper part of the windscreen and with this mounting position the control valve could be and usually was located directly on the motor casing. In motors having this location of the control valve, as at present commonly in use, when the motor is working and the fluid pressure or suction is being applied alternately to one side and then the other of the piston, the side of the piston that is not for the time being subjected to the fluid power influence is vented (i. e., put into communication with atmospheric air) by the automatic valve mechanism at the same time. When the control valve is operated to stop the motor, it is desirable that the piston should move to its parking position rapidly under the influence of the fluid power which is then applied to one side only of the piston. In order to achieve this, venting of that side of the piston must be prevented while the piston is being parked in order to avoid loss of power, and this has been taken care of by arranging that the passage which leads from the automatic valve mechanism to that side of the piston and alternately vents and admits the fluid power to that side when the motor is working, passes through the control valve so as to be cut off from that side of the piston when the latter is being parked. However, this arrangement, while avoiding loss of power when parking, has the defect when the motor is working, that the fluid power is applied by the automatic valve mechanism to that side of the piston by an indirect and restricted path through the control valve. This gives rise to airflow or suction noise, as well as leakage of power at that valve, owing to the impracticability in ordinary production of making the valve absolutely leakproof. Thus when the motor is working there is loss of power on one side, evidenced by the slower movement of the wiper blade in one direction of its sweep than in the other.

The more recently adopted practice of mounting the wiper motor below the windscreen so as to operate the blade over the lower part of the windscreen has necessitated providing for the blade to be parked outside its normal limit of sweep and at a parking position clear of the windscreen so as to permit the latter being opened. With this development it is necessary, when parking the blade, to lift it off the windscreen glass and over the windscreen frame, such as by means of a suitable ramp, and it will be appreciated that for this operation to be accomplished by the wiper motor it must have sufficient power when parking the blade. Again, owing to the presence of instruments and controls below the windscreen of a vehicle, the development mentioned has in general involved a change of position in mounting the wiper motor in order to clear the instruments, with the result that the control of the motor could no longer be direct. It was thus desirable to have remote control for the motor in order to permit the motor to be fitted at a convenient place. Remote control has already been used but prior arrangements in which the control valve is arranged at a distance from the motor do not function altogether satisfactorily in parking the wiper blade. They have the defect that when the control valve is operated to stop the motor the piston and wiper blade which should move quickly to the parking position may or may not do so, depending upon the position that the automatic valve mechanism of the motor happens to be in at the moment the control valve is operated, because in one position of the automatic valve mechanism that side of the piston which it is necessary to connect exclusively to the source of fluid pressure or suction is additionally vented and in consequence the motor loses power, so that at best it moves the piston and wiper blade to the parking position slowly, while its reduced power may be even insufficient to move the blade over the ramp to lift it over the edge of the windscreen frame. As has been explained above, loss of power when parking is avoided in the wiper motor above referred to which has the control valve located directly on the motor casing, but with the control valve at a distance the parking difficulties pointed out arise owing to the desirability from a practical viewpoint of keeping the connection between the remote control valve and motor as simple as possible. Attempts to meet this situation by employing a motor with the control valve located directly on it and operating the control valve from a distance mechanically through link rods and the like are not very satisfactory.

It is a general object of the present invention to provide a motor which will overcome or avoid the above-discussed defects of prior types. Among the more specific objects of this invention are to provide a motor which will permit balanced normal running and rapid automatic parking both to be achieved; to substantially eliminate leakage of power in the motor; to achieve substantially silent working of the motor; to provide a satisfactory remotely controlled motor and, in particular, one in which automatic parking without loss of power is assured with the simplest connection between the motor and a control valve positioned remote from the motor.

The present invention contemplates, inter alia, arranging for the application of fluid power to each side of the piston of the motor from the automatic valve mechanism of the motor to be effected directly without in either case passing through the control valve, and providing special means for controlling communication from such valve mechanism to that side of the piston to which the fluid power source is connected by the control valve for parking the piston, such means operating to prevent venting of that side of the piston when the piston is being parked.

In the accompanying drawings and the ensuing description there is disclosed a specific embodiment of the invention but it is to be understood that this disclosure is by way of example only and that the invention is not to be considered as limited otherwise than as defined in the appended claims.

In the drawings,

Fig. 1 is a general elevation of one form of motor embodying the present invention and adapted for remote control.

Fig. 2 is an interior plan view of the closure member of the motor casing,

Fig. 3 is an exploded perspective view of the control valve showing details thereof, and Figs. 4 to 7 are diagrams showing how the motor is caused to function under control of the control valve, Fig. 7 being slightly modified as to the control valve.

The motor illustrated in the drawings comprises a casing 1 fitted with a closure member 2, forming a sealed chamber 3 in which a piston 4 of the paddle or vane type swings or oscillates on a rocker shaft 5 which drives the wiper blade, the vane dividing the chamber in air tight manner into two compartments. The closure member 2 of the motor casing is provided with a passage A which is adapted to be put into communication by means of an external tube TA with a source of suction, the communication of the passage A with the suction source being under the control of a remote control valve to be referred to later. The passage A leads to valve mechanism for connecting the source of suction alternately to opposite sides of the vane in order to reciprocate it, the valve mechanism also controlling the admission of atmospheric air to the side of the vane not for the time being under suction. The valve mechanism is made automatic in action under control of the swinging movement of the vane so that the valve mechanism is automatically reversed each time the vane reaches the limit of its normal swing in each direction. In the embodiment shown, this automatic valve mechanism is of a known construction comprising a semi-rotary disc valve of segmental form having an arcuate channel therein and movable arcuately between two positions by means of a snap-action mechanism embodying a rocker actuated by a cam on the rocker shaft 5, the valve operating against a surface of the closure member 2 which has three valve ports P, $P_1$, $P_2$ disposed arcuately therein so as to cooperate with the channel in the valve. The details of this automatic valve mechanism form no part of this invention and are not therefore described. It need only be mentioned that the valve always covers the middle port P and is operated so as also to cover the ports $P_1$ and $P_2$ alternately and thereby effect communication of the ports $P_1$ and $P_2$ alternately with the port P by way of the channel in the valve. The ports $P_1$ and $P_2$ are each open to the atmosphere when not covered by the valve. The port P leads into passage A, the port $P_1$ leads into a passage D which communicates directly with the chamber 3 at one side of the vane 4, while the port $P_2$ leads into a passage E which can communicate with the chamber 3 at the other side of the vane 4 by way of the branch passage C of a passage B which is adapted to be put into communication by means of an external tube TB with the remote control valve. The branch C communicates with the chamber 3 by means of a port PP placed adjacent the parking position of the vane. It will be observed here that the communicating passages E and C provide a conduit leading from the port $P_2$ to the port PP directly without passing through the control valve. Between the branch passage C and the passage E a valve V is provided which controls communication between the passage E on the one hand and the passages C and A on the other, communication with the passage A being obtained through the passageway F. The valve V is preferably a ball, as illustrated, which is located in a small chamber formed by the meeting passages and normally seats by gravity to block the passageway F so that the passages E and C are in communication. This valve together with the various ports and passages so far described of the motor are all provided in the closure member 2 of the motor casing.

For controlling the operation of the motor a control valve is provided which is shown in Fig. 1 as being located at a distance from the motor. The control valve may be of any suitable type, that shown in the drawings being of the sliding type, which is preferred. In the embodiment of control valve shown in Figs. 1 and 3, it comprises a valve block 6 having in a face 7 thereof an elongated port 8 leading into a conduit 9 and two smaller ports 10 and 11 opposite the port 8 which lead respectively into conduits 12 and 13. A slide 14 connected to an operating knob 15 has a channel 16 therein which is arranged so that in one position of the slide the channel 16 registers with and affords communication between the ports 8 and 10 and in another position registers with and affords communication between the ports 8 and 11, while in each position the slide covers the port 10 or 11 which is not at the time in register with the channel 16. This channel 16 may be formed by cutting a groove in the thickness of the slide, or alternatively, as shown, the slide may have an elongated hole made therein which is converted into a channel by covering one face of the slide with, for example, a thin metal plate 17 and an interposed packing 18 of cardboard or the like. A blade spring 19 holds the slide against the face 7 of the valve block 6. The conduits 12 and 13 of the valve are connected to the two tubes TA and TB above mentioned and the control valve communicates with a source of suction, usually the intake manifold of the engine of the vehicle to which the wiper is fitted, by means of a tube TS attached to the conduit 9 of the valve. Thus, by the operation of the valve as just described, the slide in one position thereof establishes communication from tube TS to tube TA while closing communication to tube TB, and in another position establishes communication from tube TS to tube TB while closing communication to tube TA.

In the first-mentioned position of the control valve ("running" position), suction is applied from tube TS through tube TA to the passage A and port P of the motor, the passage B being closed in the direction of the tube TB by the slide 14 of the control valve. Referring now to Fig. 4, when the automatic valve mechanism of the motor connects the port P with port P1 suction is applied to the chamber 3 at the left hand side of the vane 4 as seen in the figure, directly through passage D. Port P2, being uncovered, admits atmospheric air which enters the chamber at the right hand side of the vane, by way of passage E, branch passage C and port PP, the ball valve V being held on its normal seat, under the influence of suction in passage A and atmospheric pressure in passage E in addition to gravity, to block passageway F and thereby shut off passage E from passage A. Under the suction applied to the left side of the vane 4 and the venting of the chamber on the right side of the vane as described, the vane swings to the left, in the direction from which air is being removed. When the vane has reached its limit of swing in that direction, reversal of the automatic valve mechanism takes place so as now to connect the port P with port P2. Consequently, the conditions illustrated in Fig. 5 now obtain, suction now being applied to the chamber 3 at the right side of the vane 4 by way of port P2, passages E and C and port PP. In this position of the automatic valve mechanism, the port P1 is uncovered and consequently admits atmospheric air through passage D to the chamber at the left side of the vane 4. Thus, the vane now swings to the right until the next reversal takes place.

When it is desired to stop the motor, the slide of the control valve is moved into its second position ("parking" position) above mentioned where the suction line TS is brought into communication with tube TB and communication to tube TA is closed. Under these conditions, represented in Figs. 6 and 7, the passage A in the motor which was previously in communication with suction through the tube TA is now closed in that direction by the new position of the slide of the control valve, while the passage B which was closed in the direction of the tube TB is now in communication with suction through that tube. In consequence of suction now being applied to passage B, the ball valve V is shifted by the applied suction so as to block communication of passage E with passage C (and thus with port PP) and establish communication between passage E and passage A through passageway F. Thus, suction is now applied through passage B and its branch C directly to the port PP and at the right side only of the vane 4.

It will be appreciated that, at the moment when the control valve is moved to the "parking" position, the automatic valve mechanism of the motor may be in the one or the other of its two positions. If it be in the position connecting port P with port P1, then whereas suction was applied to the left side of the vane and atmospheric air was admitted to the right side of the vane when the control valve was in the "running" position (see Fig. 4), thus causing the vane to be swinging to the left, now the reverse takes place, as is shown by Fig. 6, since atmospheric air is admitted to the left side of the vane by way of the port P2 (which is uncovered), passage E, passageway F, passage A, port P and passage D, while suction is applied directly to the right side of the vane through port PP as described above. Thus, the vane is arrested and swung back to the right until it reaches its parking position where it will be held until the motor is again put into operation. If, on the other hand, the automatic valve mechanism of the motor be in the position connecting the port P with port P2 when the control valve is moved to the "parking" position, then no reversal of the application of suction and atmospheric air to the chamber takes place, as a comparison of Figs. 5 and 7 will show, since in this position of the automatic valve mechanism, the vane was already being swung to the right towards its parking position when the control valve was in the "running" position, through the application of suction through port PP and the admission of atmospheric air through the uncovered port P1 as previously described (Fig. 5). When the control valve is moved to the "parking" position, suction is still applied through port PP, but this time directly through passage B (Fig. 7), and atmospheric air is still admitted through the uncovered port P1. Thus, the vane continues its swing to the right until it reaches its parking position where it will, as before, be held until the motor is again put into operation.

The parking position of the vane may be arranged at the limit of its normal arc of swing or outside this arc (the latter being preferred) without in any way affecting the operation as described, because when the control valve is moved to the "parking" position suction is applied through port PP to the right side of the vane and atmospheric air is admitted through port $P_1$ to the left side of the vane, regardless of the position of the automatic valve mechanism of the motor.

The vane is provided on its right side with a pad 4' of leather or other flexible material which contacts the rim of a collar 20 provided on the underside of the closure member 2 when the vane reaches its parking position. The collar 20 encloses the port PP and thus it will be appreciated that in the parking position of the vane, the flexible pad thereon closes this port and relieves the vane of any constant suction influence thereon, the pad being held in place against the collar 20 by the air pressure on the left side of the vane. This prevents the lubricant in the chamber from otherwise drying out under the suction influence and causing leakage around the vane. If, by vibration or for any other reason, the vane should tend to creep or fall away from its parking position, this would uncover the port PP whereupon suction would be re-applied to the right side of the vane so as to return it quickly to its parking position. Clearly, the flexible pad also acts as a buffer or shock absorber safeguarding the vane against damage when it is arrested in its rightward swing by the collar 20.

In the foregoing description of the functioning of the motor it has been assumed that the motor is mounted in the upright position shown in the drawings so that the ball valve V normally seats under gravity in the position shown in Figs. 1, 4 and 5, and remains in its normal position when the motor is being operated. In the condition shown in Fig. 5, suction acts on both sides of the valve V, and if it is desired to hold the ball on its normal seat by suction in addition to gravity, this may be effected by suitably choosing the bores of the passages A and E so that there is less suction on the ball through passage E than through passage A. The motor is intended to be mounted in the position shown, but while such mounting is preferred, consideration of the disclosure will show that the motor will function similarly if inverted or mounted in any other position or inclination than that shown, because the operation of the ball valve V is controlled essentially by differential fluid pressure. If the motor be inverted, however, the bores of the passages A and E should be chosen as above described so that the valve closes the passageway F in the condition shown in Fig. 5, and for this purpose the valve V should be made light in weight. It will also be clear that the functioning of the motor will in no wise be altered by locating the control valve directly on the motor casing instead of at a distance.

The arrangement which has been specifically described provides, in simple manner and with simple means, for achieving the objects of the invention. It will be apparent, however, to those skilled in the art that other arrangements or modifications which will be equally successful are possible, though probably less simple in character. For instance, it should be obvious that the control valve need not close the passage A which is not for the time being connected to the suction source, but may leave that passage open to the atmosphere through a vent 16, as shown in Fig. 7, in which case the operation of the motor as depicted in Figs. 4, 5, 6 and 7 will be unaffected by this change.

I claim:

1. In a fluid operated windscreen wiper motor having a reciprocable piston and automatic valve mechanism for applying fluid power alternately to the opposite sides of said piston for operating the motor, and having a control valve which is operable selectively to connect a source of fluid power either by one passage to said valve mechanism for operating the motor or by a second passage to one side only of the piston for moving the piston to a parking position and there stopping the motor, the provision of a conduit leading from said valve mechanism directly to said one side of the piston without passing through said control valve, said conduit affording communication between said one side of the piston and either fluid power or atmospheric air according to the operation of said valve mechanism when the motor is working, and valve means operable by the difference between the pressures in the conduit and the second passage for blocking said conduit when the control valve is operated to park the piston.

2. A fluid operated windscreen wiper motor having a reciprocable piston and automatic valve mechanism for connecting a source of fluid power alternately to opposite sides of the piston for operating the motor and at the same time venting the side of the piston not for the time being under the influence of said source, and a control valve which when in one position connects said source through one passage to the automatic valve mechanism for operating the motor and when in another position disconnects said source from the automatic valve mechanism and connects it through a second passage to one side only of the piston to move the latter to a parking position where the piston stops, characterized in that a conduit leads from the automatic valve mechanism directly to the said one side of the piston without passing through the control valve, a valve operable by the differential in the pressures in the second passage and the conduit and provided in the latter to prevent the venting of that side of the piston to which said source is connected when the control valve is moved to park the piston, thereby avoiding loss of power whilst the piston is being moved to the parking position.

3. In a fluid operated windscreen wiper motor having a casing and a reciprocable piston therein and automatic valve mechanism which is operable to apply fluid power alternately to the opposite sides of the piston while at the same time venting the side of the piston not for the time being under the influence of the fluid power whereby to operate the motor, and having a control valve operable selectively to connect a source of fluid power either through a first passage to said automatic valve mechanism for operating the motor or through a second passage to one side only of the piston for moving it to a parking position and there stopping the motor, a conduit in said casing associated with said valve mechanism to put the said one side of the piston into communication with fluid power or atmospheric air, according to the operation of said valve mechanism when the motor is working, valve means in said conduit operable by differential fluid pressure for blocking said conduit when said control valve is operated to park the piston, there being a connecting passage between the first passage and the conduit which is normally closed by said valve means when the valve mechanism is operative and is opened when said valve means moves to block the conduit.

4. A fluid operated windscreen wiper motor comprising a casing forming a chamber, a piston reciprocable in said chamber, a passage in said casing, automatic valve means operable to put said passage alternately into communication with said chamber on opposite sides of the piston while at the same time affording communication with the atmosphere for the chamber on that side of the piston not for the time being in communication with said passage, a second passage in said casing leading directly into said chamber on one side only of the piston, a control valve positioned at a point remote from the motor and operable for selectively connecting a source of fluid power to either of said passages and adapted to close that passage of the two not for the time being connected to said source, and valve means in said casing operable to close communication through said automatic valve means between the atmosphere and said chamber on the side into which said second passage leads when said second passage is in communication with said source.

5. In a fluid operated windscreen wiper motor, a reciprocable piston, automatic valve means, a conduit adapted to be connected to a source of fluid power leading to said automatic valve means, passages leading from said automatic valve means to opposite sides respectively of the piston, said automatic valve means being operable for connecting either the atmosphere or the first-mentioned conduit alternately to the passages for providing an operating pressure differential on the piston, a conduit adapted to be connected to said source, leading directly to one side only of the piston exclusively of the automatic valve means, and a check valve in the passage leading from the automatic valve means to said one side of the piston and operable to close that passage when the conduit which leads directly to that side of the piston is connected to said source, and to open that passage when the conduit which leads to the automatic valve means is connected to said source, said check valve acting in response to the differential in the pressures in said conduits.

6. A fluid operated windscreen wiper motor comprising a casing forming a piston chamber containing a reciprocable piston, a passage in said casing adapted to be connected to a source of fluid power and leading directly into the piston chamber on one side only of the piston, automatic valve means, a second passage in said casing adapted to be connected to said source and leading to said automatic valve means, two further passages in the casing which lead from said automatic valve means into the chamber at opposite sides of the piston respectively, said automatic valve means being operable to put said second passage into communication with either of said further passages and to simultaneously vent the other one of the latter, and a check valve in that further passage which leads into the chamber at the same side of the piston as does the first-mentioned passage and operable by the differential in the pressures in the first and second mentioned passages, the check valve being adapted to block communication of that further passage with the chamber on the said side of the piston when fluid power is applied to the first-mentioned passage to park the piston and to allow such communication when the fluid power is applied to the second-mentioned passage to operate the motor.

7. A windscreen wiper motor as claimed in claim 6, wherein the check valve also controls communication of that said further passage with said second passage so as to connect said passages while blocking communication of that said further passage with the chamber.

8. A fluid operated windscreen wiper motor comprising a reciprocable piston, an automatic valve, a first passage adapted to be connected to a source of fluid power and leading directly to one side only of the piston, a second passage adapted to be connected to said source and leading to the automatic valve, a third passage leading from the automatic valve and having intermittent communication with said side of the piston through said first passage, and a fourth passage leading from the automatic valve to the other side of the piston, the automatic valve being operable to put said second passage selectively into communication with either of said third and fourth passages and to put into communication with the atmosphere that passage of the two last-mentioned not for the time being in communication with the second passage, said third passage having intermittent communication with said second passage independently of the automatic valve, and a valve operable by differential fluid pressure for establishing communication between the third passage and the first passage when the second passage is connected to said source and to close such communication and establish communication between the third passage and the second passage when the first passage is connected to said source.

9. A windscreen wiper motor as claimed in claim 8, wherein said valve operable by differential fluid pressure consists of a ball located in a ball chamber which communicates with the first, second and third passages.

10. A fluid operated windscreen wiper motor comprising a reciprocable piston, an automatic valve for controlling the reciprocation of the piston by alternately applying differential pressures to the opposite sides of the piston, a conduit adapted to be connected to a source of fluid power and leading to a first port of the automatic valve, a second conduit adapted to be connected to said source and having constant communication with one side of the piston and intermittent communication with a second port of the automatic valve through a valve chamber in the second conduit, the first conduit having intermittent communication with the second port through the valve chamber, and a valve in the valve chamber operable by differential fluid pressure for establishing communication between said second port and the second conduit when the fluid power is applied through the first conduit to said first port for reciprocating the piston, and for automatically closing such communication and establishing communication between said second port and the first conduit when the fluid power is applied through the second conduit directly to said one side of the piston for parking the piston.

WILLIAM E. O'SHEI.